Feb. 1, 1927.
J. R. FELL
1,616,359
CULTIVATOR
Filed Jan. 30, 1926
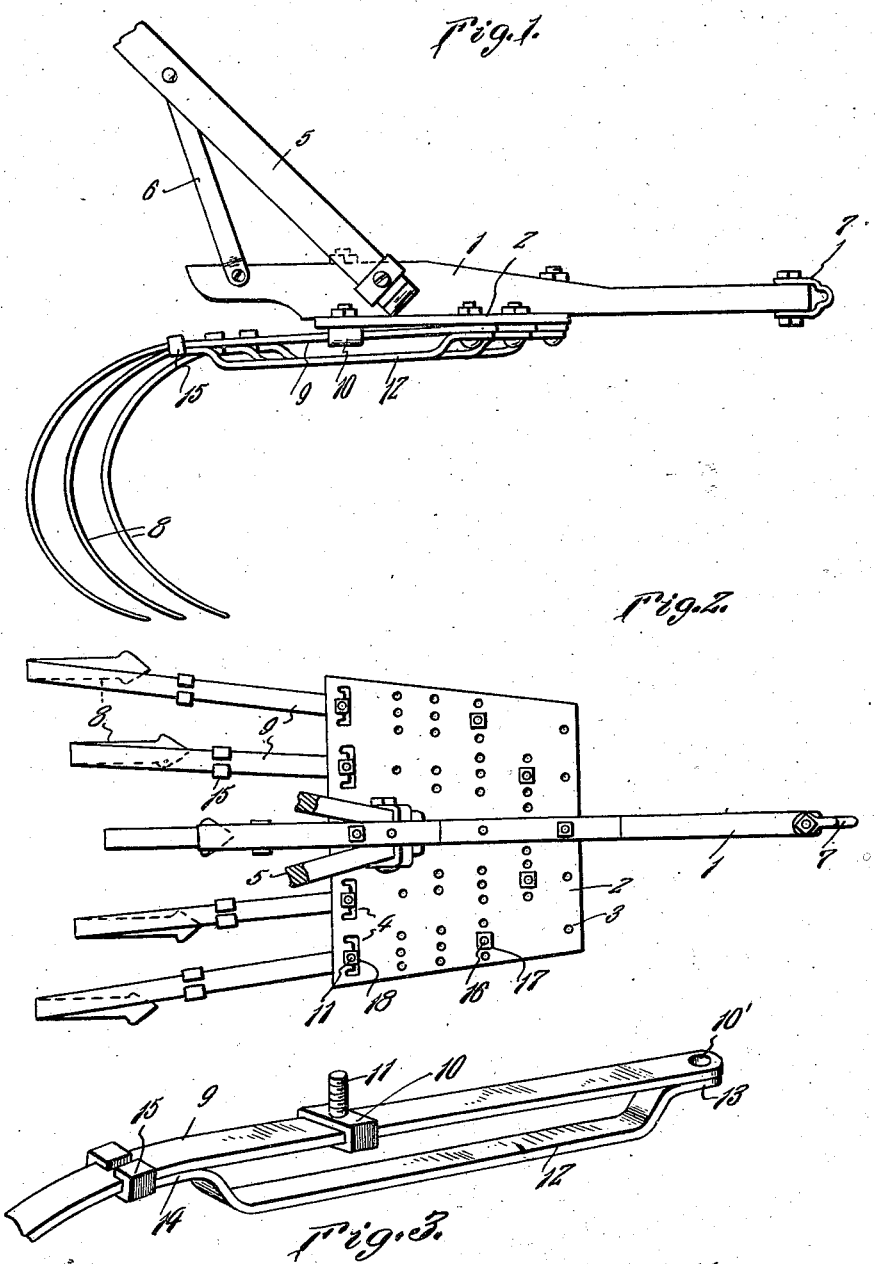
INVENTOR
J. R. Fell
BY Victor J. Evans
ATTORNEY Patented Feb. 1, 1927.

1,616,359

UNITED STATES PATENT OFFICE.

JAMES RICHARD FELL, OF HALEYVILLE, ALABAMA.

CULTIVATOR.

Application filed January 30, 1926. Serial No. 84,987.

My present invention has reference to spring toothed cultivators.

An object is to simplify and improve the existing art, by producing a spring toothed cultivator construction, wherein the spring teeth may be arranged at any desired angle with respect to each other, and effectively supported at such angles.

A further object is the provision of means for yieldably supporting and for reinforcing the straight shanks of the spring toothed cultivators in a manner which will permit of yielding of the teeth, without liability of the breakage thereof, when the said teeth are brought into contact with obstacles such as stones or the like.

To the attainment of the foregoing objects and others which will appear as the nature of the invention is better understood, the improvement further resides in certain features of construction, combination and operative association of parts, a satisfactory embodiment of which is illustrated by the accompanying drawings.

In the drawings:—

Figure 1 is a side elevation of a spring toothed cultivator in accordance with this invention.

Figure 2 is a top plan view thereof.

Figure 3 is a perspective view of a shank of one of the cultivator teeth illustrating the reinforcement therefor, and the element thereon which permits the tooth being arranged angularly with respect to its support.

As disclosed by Figures 1 and 2 of the drawings, I rigidly secure on the under face of the beam 1 of the cultivator a metal plate 2. The plate is of a desired length and width, and is centrally secured on the beam 1. Preferably, the plate has its rear end of a greater width than its front end, so that its sides or edges are inclined. The plate, throughout its surface is provided with any desired series of spaced laterally extending rounded openings 3. These openings are disposed adjacent to the front or narrow end of the plate, while the widened end of the plate is provided with a longitudinal series of elongated openings 4.

The beam 1 has thereon the usual handles 5 braced, as at 6, and at its forward end the ring or clevis 7, whereby the draft animals are hitched to the cultivator.

The rounded spring teeth proper are indicated each by the numeral 8. Each tooth is formed at one end of a straight shank 9. Each shank has its outer end provided with an opening 10' and has slidably arranged thereon what I will term a socket member 10 that is provided with an upstanding bolt 11.

The numeral 12 designates the reinforcing member or plate for each of the stems 9. The member 12 has its outer end bent upwardly and extended in a plane with the plate proper, as indicated by the numeral 13, and this portion 13 underlies the outer end of the shank and is provided with an opening that registers with the opening 10'. The rear end of each of the plates 12 is also rounded upwardly and extended in a plane with the plate proper, as indicated by the numeral 14. This portion 14 has its edges formed with substantially U-shaped ears 15 which are arranged over the shank 9. It is to be understood that the shank 9 is movable through the ears 15 for a slight distance, as when the tooth 8 contacts with an obstacle on the ground.

There is passed through the openings 10' and the opening in the portions 13 of the plates 12, bolt members 16. These bolts also pass through any one of a series of openings 3 in the plate, and the said bolts are, of course, engaged by nuts 17. The bolts 11 on the respective shanks pass through one of the elongated openings 4 in the plate and these bolts are also engaged by nuts 18. By such arrangement it will be noted that the teeth of the cultivators may be arranged at desired angles with respect to each other, and that one of the teeth may be arranged forwardly or rearwardly with respect to the remaining tooth. It will be further noted that the plates 12 support the shanks and therefore the teeth 8 normally in one position, and that the said plates materially reinforce the shanks and teeth of the cultivators to prevent the bending or breaking thereof when the said teeth contact with an obstacle on the ground.

The improvement is, of course, susceptible to changes and modifications from the construction illustrated and is limited in such respect only to the scope of what is claimed.

Having described the invention, I claim:—

A cultivator, including a beam having a plate centrally secured to the under face at the rear thereof, said plate having spaced series of round openings and having a series of elongated openings, spring toothed cultivators having their rounded active ends merging into straight shanks, a bolt carrying socket member slidable on each shank, a spring plate arranged beneath each shank and having its ends rounded upwardly and outwardly for contacting with the under faces of the said shanks, the rear end of each spring plate being provided with ears which are arranged over the said shanks, said bolts designed to be passed through the elongated openings in the plates and to be engaged by nuts and bolts passing through the front ends of the plates and shanks and received through any one of the series of rounded openings and said bolts designed to be engaged by nuts.

In testimony whereof I affix my signature.

JAMES RICHARD FELL.